(12) United States Patent
Kosvintsev

(10) Patent No.: US 9,028,730 B2
(45) Date of Patent: May 12, 2015

(54) METHOD OF PRODUCING UNIFORM POLYMER BEADS OF VARIOUS SIZES

(71) Applicant: Purolite Corporation, Bala Cynwyd, PA (US)

(72) Inventor: Serguei Rudolfovich Kosvintsev, Porth (GB)

(73) Assignee: Purolite Corporation, Bala Cynwyd, PA (US)

( * ) Notice: Subject to any disclaimer, the term of this patent is extended or adjusted under 35 U.S.C. 154(b) by 302 days.

(21) Appl. No.: 13/836,939

(22) Filed: Mar. 15, 2013

(65) Prior Publication Data
US 2014/0264984 A1    Sep. 18, 2014

(51) Int. Cl.
B01J 2/06    (2006.01)
B01J 2/12    (2006.01)

(52) U.S. Cl.
CPC ........................................ B01J 2/12 (2013.01)

(58) Field of Classification Search
None
See application file for complete search history.

(56) References Cited

U.S. PATENT DOCUMENTS

| | | | |
|---|---|---|---|
| 2,694,700 A | 11/1954 | Shanta | |
| 3,728,318 A | 4/1973 | Hamann et al. | |
| 3,862,924 A | 1/1975 | Hamann et al. | |
| 4,444,961 A | 4/1984 | Timm | |
| 4,623,706 A | 11/1986 | Timm et al. | |
| 4,666,673 A | 5/1987 | Timm | |
| 6,221,926 B1 | 4/2001 | Oohara et al. | |
| 7,727,555 B2 | 6/2010 | DiCarlo et al. | |
| 2009/0062407 A1 | 3/2009 | Iversen et al. | |
| 2009/0166291 A1 | 7/2009 | Jackson | |
| 2009/0281272 A1 | 11/2009 | Yilmaz et al. | |
| 2010/0103769 A1* | 4/2010 | Bachman et al. | ............. 366/340 |
| 2012/0175798 A1 | 7/2012 | Fukuda et al. | |

FOREIGN PATENT DOCUMENTS

| | | |
|---|---|---|
| GB | 2 385 008 | 10/2005 |
| GB | 2 444 035 | 5/2008 |
| WO | WO 01/45830 | 6/2001 |

OTHER PUBLICATIONS

Dowding, P.J. et al, 2001, "Production of porous suspension polymer beads with a narrow size distribution using a cross-flow membrane and a continuous tubular reactor", Colloids and Surfaces A: Physicochemical and Engineering Aspects, 180:301-309.

Holdich, R.G et al 2010, "Membrane emulsification with oscillating and stationary membranes", Industrial and Engineering Chemistry Research, vol. 49, pp. 3810-3817.

International Search Report and Written Opinion, mailed Aug. 30, 2012, which issued in corresponding International Application No. PCT/US2012/020484.

(Continued)

Primary Examiner — Mary F Theisen
(74) Attorney, Agent, or Firm — Fish & Richardson P.C.

(57) ABSTRACT

Speriodal polymer beads having a uniform size are prepared by polymerizing uniformly sized monomer droplets formed by dispersing a polymerizable monomer phase over double-walled cylindrical cross-flow membrane into an aqueous phase. A shear force is provided at a point of egression of the polymerizable monomer phase into the aqueous phase, the direction of shear substantially perpendicular to the direction of egression of the monomer phase. The polymer beads can be employed in applications where beads having uniform diameters of 10 to 200 μm are useful.

26 Claims, 4 Drawing Sheets

(56) References Cited

OTHER PUBLICATIONS

Ma, G. et al., "Preparation of uniform-sized polystyrene-polyacrylamide composite microspheres from a w/o/w emulsion by membrane emulsification technique and subsequent suspension polymerization", Macromolecules, 2004, 37:2954-2964.

Malik, D.J et al 2009, "Synthesis and characterisation of size-selective nanoporous polymeric adsorbents for blood purification", Separation and purification technology, vol. 66, pp. 578-585.

Omi, S. et al 1994, "Synthesis of polymeric microspheres employing SPG emulsification technique", Publication from the Department of Chemical Engineering, Tokyo, pp. 1-11.

"Particles," Jul. 30, 2013, Micropore Technologies' Website, 3 pages.

Schadler, V. & Windhab, E.J. 2006, "Continuous membrane emulsification by using a membrane system with controlled pore distance", Desalination, vol. 189, No. 1-3, pp. 130-135.

Third Party Submission submitted in U.S. Appl. No. 13/345,244, with concise description of relevance, Jun. 18, 2013.

Vladisavljevic, G.T. & Williams, R.A. 2006, "Manufacture of large uniform droplets using rotating membrane emulsification", Journal of colloid and interface science, vol. 299, No. 1, pp. 396-402.

Vladisavljevic, G.T., "Recent developments in manufacturing emulsions and particulate products using membranes", Advances in Colloid and Interface Science, 2005, 113:1-20.

Wolska, J. & Bryjak, M. 2009, "Preparation of poly(styrene-co-divinylbenzene) microspheres by membrane emulsification", vol. 241, No. X, pp. 331-336.

"wow for healthy eating," www.tcetoday.com, Mar. 2010, 1 page.

Yuyama, H. et al. 2000, "Preparation and analysis of uniform emulsion droplets using SPG membrane emulsification technique", Colloids and Surfaces A: Physicochemical and Engineering Aspects, vol. 168, pp. 159-174.

\* cited by examiner

METHOD OF PRODUCING UNIFORM POLYMER BEADS OF VARIOUS SIZES

FIELD OF THE INVENTION

The present invention relates generally to the preparation of spheroidal polymer beads, and more particularly, to the preparation of spheroidal polymer beads having a substantially uniform particle size. Such beads are useful in the manufacture of ion exchange resins.

BACKGROUND OF THE INVENTION

Spheroidal polymer beads in the size range from about 1 to 300 μm in diameter are useful for a variety of applications. For example, such polymer beads have been employed for various chromatographic applications, as substrates for ion exchange resins, seeds for the preparation of larger sized polymer particles, calibration standards for blood cell counters, aerosol instruments, in pollution control equipment, and as spacers for photographic emulsions, among other uses.

Unfortunately, however, the preparation of uniformly sized polymer beads using known methods is often not suitable for large-scale production. Typically, polymer beads can be prepared by suspension polymerization by dispersing an organic monomer phase as droplets in a vessel equipped with an agitator and an aqueous phase in which the monomer and resulting polymer are essentially insoluble. The dispersed monomer droplets are subsequently polymerized under continuous agitation (see, for example, U.S. Pat. Nos. 3,728,318; 2,694,700; and 3,862,924). Polymer beads are also manufactured by "jetting" liquid organic monomer mixtures through capillary openings into an aqueous phase or gaseous phase. The monomer droplets are then transported to a reactor where polymerization occurs, as described, for example, in U.S. Pat. Nos. 4,444,961; 4,666,673; 4,623,706; and 8,033,412. However, these conventional methods, such as stirred batch polymerization, often produce bead products exhibiting large particle size distributions, primarily due to problems of coalescence and/or breakage of the suspended monomer droplets. Existing jetting methods also suffer from high cost and low output for particle size products of less than 300 μm. For example, plate jetting methods have low overall productivity and are limited by large energy losses during the vibration generation step. Moreover, methods which require jetting into a gaseous media demand very sophisticated equipment and complex methods for polymer formation. The use of cross-flow membranes for the generation of fine droplets using a metal or glass sintered or electro-formed membrane is appropriate for small scale applications but is unfeasible for commercial operation. Further, the low productivity per unit area of the cross flow membrane requires complex and bulky equipment which is unreliable and demands high capital and operating costs.

Accordingly, it would be desirable to provide an efficient and highly productive method for preparing uniform polymer beads whereby the deficiencies associated with conventional methods can be avoided.

SUMMARY OF THE INVENTION

An object of the invention is to provide a simple and highly efficient method for preparing uniform sized spheroidal polymer beads having a narrow particle size distribution.

Accordingly, one embodiment of the invention is directed to a method for preparing uniform spheroidal polymer beads having a volume mean particle diameter ($D_{50}$) of about 1 to about 300 μm. The method includes providing a double-walled cylindrically shaped apparatus having a metallic membrane containing a plurality of pores. A first volume enters the annulus between two membrane walls, a second volume is in contact with two outer walls of the membrane enclosing the annulus. The first volume includes a dispersed phase, for example a polymerizable monomer phase or hydrocolloid solution. The second volume includes a suspension phase immiscible with the dispersed phase. The first volume is dispersed through the pores into the second volume under conditions sufficient to form droplets of the dispersed phase. A shear force is provided at a point of egression of the first volume into the second volume. The direction of shear is substantially perpendicular to the direction of egression of the first volume. The dispersed phase droplets dispersed in the second volume are then polymerized (or cross-linked or gelate), forming the desired polymer beads.

In another embodiment, the invention provides a polymerization product in the form of polymer beads having a particle size of about 10 to about 300 μm wherein at least about 70 percent of the beads possess a particle size from about 0.9 to about 1.1 times the average particle size of the beads.

Additional advantages, objects, and features of the invention are set forth in part in the description which follows and will become apparent to those having ordinary skill in the art.

BRIEF DESCRIPTION OF THE DRAWINGS

Non-limiting and non-exhaustive embodiments of the present invention are described with reference to the following drawings. For a better understanding of the present invention, reference will be made to the following Detailed Description, which is to be read in association with the accompanying drawings, wherein.

DETAILED DESCRIPTION

It is understood that the invention(s) described herein is (are) not limited to the particular methodologies, protocols, and reagents described, as these may vary. It is also to be understood that the terminology used herein is for the purpose of describing particular embodiments only, and is not intended to limit the scope of the present invention. Unless defined otherwise, all technical and scientific terms used herein have the same meanings as commonly understood by one of ordinary skill in the art to which this invention belongs. Any methods and materials similar or equivalent to those described herein can be used in the practice or testing of the present invention.

All publications, including all patents, patent applications and other patent and non-patent publications cited or mentioned herein are incorporated herein by reference for at least the purposes that they are cited; including for example, for the disclosure or descriptions of methods of materials which may be used in the invention. Nothing herein is to be construed as an admission that a publication or other reference (including any reference cited in the "Background of the Invention"

section alone) is prior art to the invention or that the invention is not entitled to antedate such disclosure, for example, by virtue of prior invention.

The skilled artisan will appreciate that the numerical values presented herein are approximate values. Generally, unless otherwise indicated, terms such as "about" and "approximately" include within 20% of the values indicated, more preferably within 10% and even more preferably within 5%.

Figure 1:
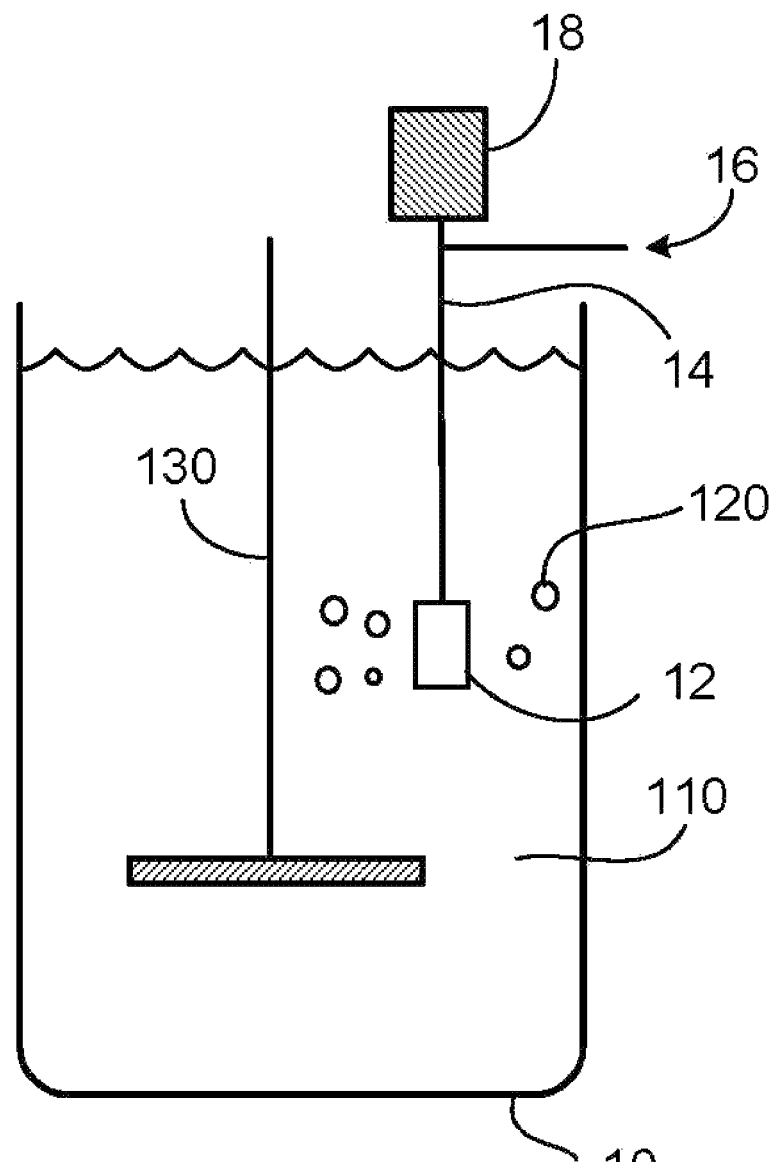
FIG. 1 is a schematic representation illustrating a monomer reactor unit of the invention.
Figure 2:
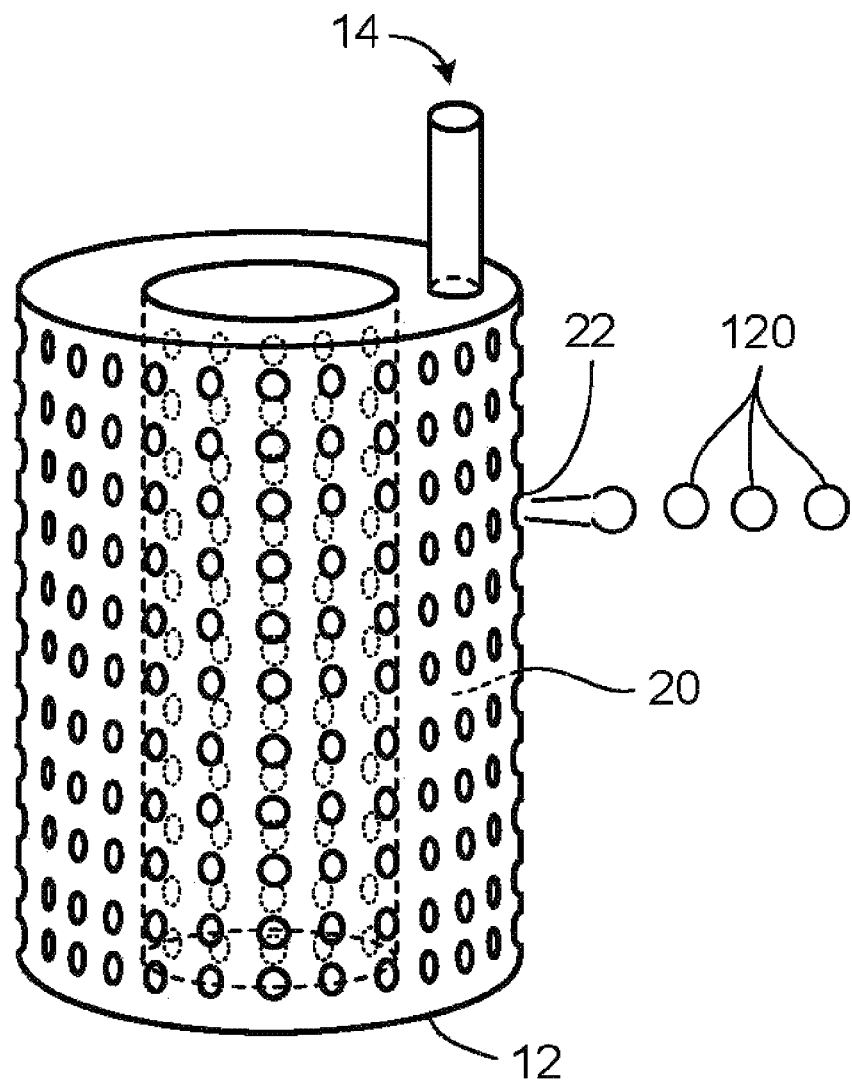
FIG. 2 is a schematic representation illustrating a monomer jet-forming means of the invention.

Referring now more particularly to the drawings, FIG. 1 depicts monomer reactor unit 10 having a monomer jet-forming membrane 12 which connects with a monomer feed tube 14 attached to a monomer reservoir feed conduit 16. A means for vibrating the membrane 12 includes a vibrator 18 which incorporates the monomer feed tube 14. The vibrator is connected by electrical contact to a variable frequency (oscillating) electrical signal generator (not shown) in a manner so that the vibrator 18 vibrates at the frequency generated by the oscillating signal generator. The monomer reactor unit 10 is also equipped with a stirring means 130. In FIG. 2, membrane 12 includes an annulus 20 containing a dispersed phase (polymerizable monomer or hydrocolloid). Membrane 12 is supplied with the dispersed phase via feeding tube 14. Membrane 12 is also suspended in a liquid phase 110 of a suspension medium containing a liquid immiscible with the dispersed phase. The membrane 12 is configured in the shape of a double-walled can or cylinder comprising an outer cylindrical component with a continuous side wall, and an inner cylindrical component with a continuous side wall enclosing the annulus. As shown in FIG. 2, the side wall of the inner component is spaced inwardly from the side wall of the outer component and includes a constant diameter throughout the height of the outer wall. The side wall of the inner component and the side wall of the outer component include continuous upper and bottom rims and the rims are joined to form an air tight compartment between the inner and outer components. The inside and outside wall of membrane 12 includes through-holes (or pores) 22. The cylindrical double-walled shape of 12 ensures that equal force/acceleration is obtained in every pore 22 on the membrane 12. This is necessary to ensure uniform bead generation.

Figure 3:
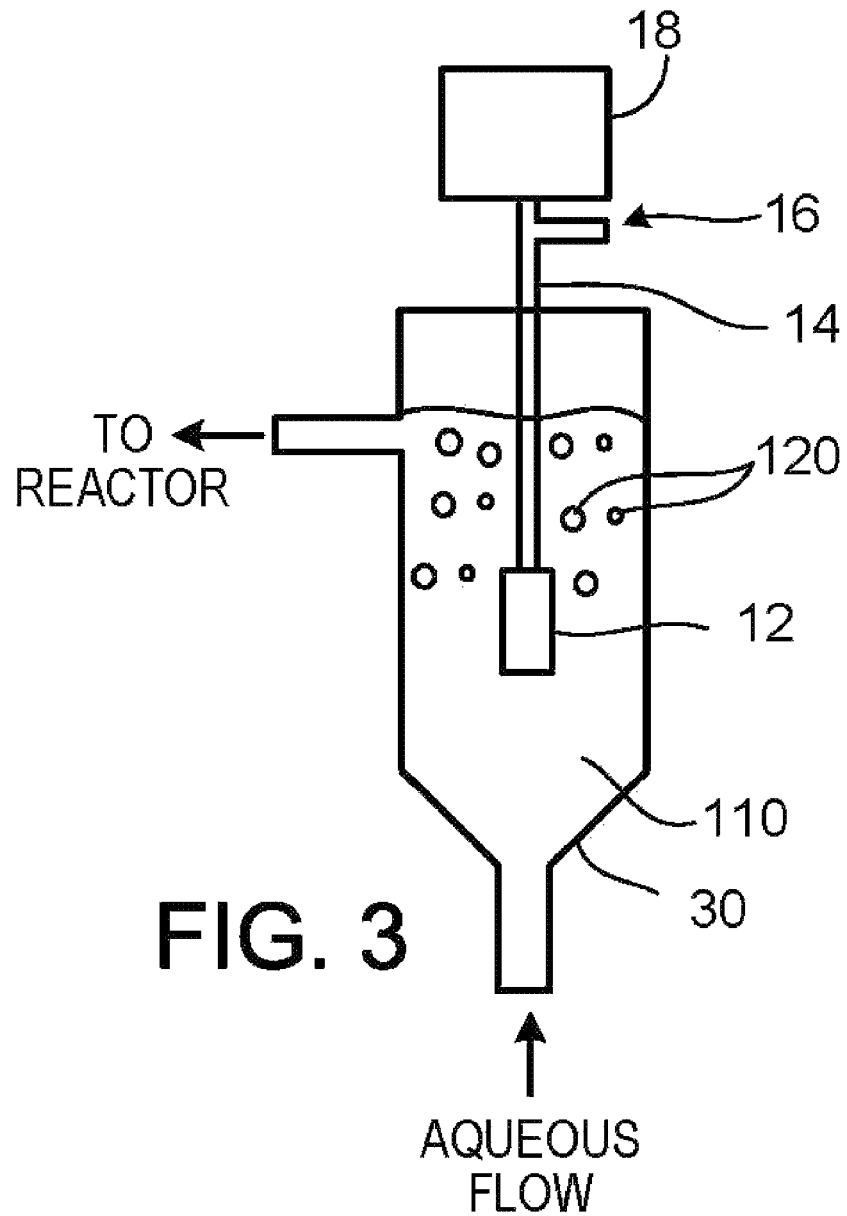
FIG. 3 is a schematic representation illustrating a monomer disperser unit of the invention.

In operation, the dispersed phase includes a phase containing mixtures of one or more copolymerizable monomers, or mixtures of one or more copolymerizable monomers or a hydrocolloid (such as dexstrose and agarose, (polysaccharides)) or other gel forming compound (such as PEG, PVA) with a non-polymerizable material (e.g., and inert porogenic or pore-forming material, prepolymer, or the like) is introduced to the feed tube 14 via the reservoir feed conduit 16 and is deposited in (or fills) the annulus 20 in the membrane 12. The dispersed phase is fed into the feed tube 14 at a rate such that the dispersed phase is forced through the pores 22 of the membrane 12 into the liquid phase 110 at a rate sufficient to form jets having flow characteristics to form a plurality of dispersed phase droplets 120. The dispersed phase droplets can be generated directly into a reactor unit 10 or generated into a collection tank 30 as shown in FIG. 3, where the droplets are continuously released from the collection tank to a reactor. Droplets accumulate at the top of collection tank 30 by natural buoyancy and continuous aqueous flow. The flow can be equal to the monomer feeding rate or 1.5-3 times higher depending on the specific monomer used and the size of the droplets generated.

As the dispersed phase jet flows into the liquid phase 110, the jet is excited at a frequency which breaks the jet into droplets. In general, the membrane 12 is excited using suitable conditions so that substantially uniform sized droplets are prepared. By the term "substantially uniform" is meant that droplets exhibit a particle size distribution having a coefficient of variance (i.e., the standard deviation of the population divided by the population mean) of less than about 30% or about 10, 15, 20, 25, or about 29%. A coefficient of variation of less than about 15% is preferred. In another embodiment of the invention, about 70 percent, or about 90 percent, of the beads possess a volume particle diameter from about 0.90 and about 1.1 times the average volume particle diameter of the beads.

The particular conditions at which the droplets are formed depend on a variety of factors, particularly the desired size and uniformity of the resulting droplets and the resulting spheroidal polymer beads. In general, the dispersed bead droplets are preferably prepared to have a coefficient of variance of particle size distribution of less than about 20%, more preferably less than about 15%. Most preferably, the coefficient of variance of the particle size of the monomer droplets is less than about 10%. After forming the dispersed phase droplets, the subsequent polymerization or gel formation of the dispersed phase is performed using conditions which do not cause significant coalescence or additional dispersion and that will result in the formation of spheroidal polymer beads having a particle size such that at least about 50 volume percent have a particle diameter from about 0.9 to about 1.1 times the average particle diameter of the beads. Advantageously, at least about 60 volume percent, preferably 70 volume percent, more preferably at least about 75 volume percent of the beads exhibit such particle size. The invention also provides spheroidal polymer beads having a volume average particle diameter (i.e., the mean diameter based on the unit volume of the particle) between about 1 μm to about 300 μm. The average volume diameter of the polymer bead of the invention is preferably between about 1 μm and about 300 μm, more preferably between about 10 to about 180 μm, or about 35 to about 180 μm with additional preferred ranges of between about 40 μm to about 180 μm, about 100 to about 160 μm. The volume average particle diameter can be measured by any conventional method, for example, using optical imaging, laser diffraction or elecrozone sensing. Electrozone sensing involves the analysis of particle samples immersed in a conducting aqueous solution. Within the solution is an anode and a cathode containing a sensor. The particles are attracted to the sensor by electrical charge. Each particle displaces some amount of liquid as it passes through the sensor and causes a disruption in the electric field. The extent of the disruption corresponds to the size of the particle, and by measuring the number and size of the changes in impedance, it is possible to track particle distribution. The particle diameter may also be measured using optical microscopy or by employing other conventional techniques such as those described in U.S. Pat. No. 4,444,961.

Figure 4:
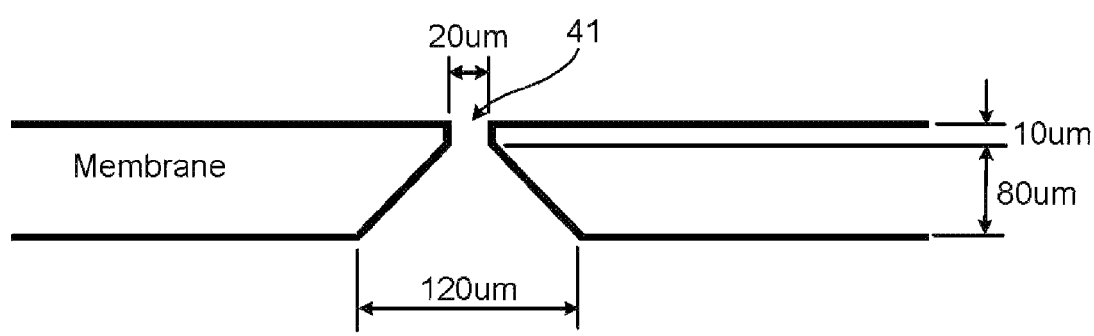
FIG. 4 is a schematic representation illustrating a membrane pore of the invention.

Regarding the various elements of the invention, the jet-forming membrane 12 can include any means through which the dispersed phase can be passed under conditions such that a jet or plurality of jets of the dispersed phase is formed having laminar flow characteristics. Although membrane 12 can consist of a plate or similar device having a plurality of pores, it is preferred that membrane 12 includes a double walled can-shape enclosing an annulus as shown in FIG. 2. Using a can-shaped membrane allows a relatively small volume to be occupied in the reactor and also affords high productivity generation of uniform drops, ranging from 0.006 to 0.6 kg/hour per $cm^2$ of membrane. For example, for a can membrane of 6×16 cm, productivity can be from 3 kg/hr up to 300 kg/hour. Membrane 12 may also be in the form of a candle, spiral wound, or flat. The external walls enclosing the annulus of the membrane 12 contains a plurality of through pores 22. For example, the membrane can include about 200 to about 20,000, preferably 1,500 to 2,000 pores per cm$^2$ throughout the surface of the membrane. The shape of the membrane pores may vary. For example, the shape of the pores can be cylindrical, or conical. FIG. 4 is a schematic illustrating conical-shaped membrane pore 41 of the invention. In another embodiment, the pores are in the shape of a slot. In this embodiment, the slot includes an aspect ratio of slot width to slot length of at least 1:2, preferably 1:3. The aspect ratio of slot width to slot length may be in the range of 1:2 to 1:100. The membrane pores may be fabricated by any conventional method. For example, the membrane pores may be fabricated by drilling, laser treating, electro-forming, or water jetting the membrane. The membrane pores are preferably electro-formed by electroplating or electroless plating of nickel on a suitable mandrel. Use of electro-formed membranes enables a variety of pore sizes and shapes with virtually any pitch required. This gives the possibility of fine tuning drop sizes and achieving high production of polymer beads with well-defined particle size distributions. Electro-forming as opposed to drilling allows for the production of round pores with a higher number of pores per unit area. In some embodiments of the invention, the membrane pores are perpendicular to the surface. In another embodiment, the membrane pores are positioned at an angle, preferably at an angle from 40 to 50 degrees. The diameter of the pores 22 can range from less than about 1.0 μm to about 100 μm, preferably 20 μm to 60 μm, wherein diameter refers to the cross-section of the opening having the smallest diameter 41. The diameter of each opening is primarily determined by the desired size of the dispersed phase droplets. Typically, the desired droplet size will vary from about 5 to about 300 μm, more typically from about 50 to about 180 μm, most typically from about 150 to about 170 μm. While the pore diameter which will produce this size droplet is dependent on a variety of factors including the physical properties, e.g., viscosity, density and surface tension of the dispersed phase, and the conditions of the vibrational excitation, typically, pore diameters from about 1 to about 100 μm, more typically from about 20 to about 60 μm are employed.

The plurality of pores 22 in membrane 12 are spaced at a distance apart from each other so that the formation of the uniformly sized monomer droplets and the stability of the resulting droplets are not affected by the laminar jet and droplet formation of an adjacent jet. In general, interactions between the droplets formed from adjacent jets are not significant when a passage is spaced at a distance of at least about 2-5 times the diameter of each opening apart from the nearest passage, when the distance is measured from the center of each passage. Similarly, when a plurality of membranes are employed in a reactor or collection tank, the spacing and arrangement of the membranes are positioned so that the formation of droplets is not disrupted by the formation of droplets at an adjacent membrane.

Although the membrane 12 can be prepared from a variety of materials including metal, glass, plastic or rubber, a perforated metal membrane is preferably employed. The membrane may be substantially metallic, or wholly metallic. The membrane may also contain a chemically-resistant metal such as a noble metal or stainless steel or may be pretreated with a chemical reagents. Suitable materials and membrane configurations for use in this invention are disclosed, for example, in International Publication No. WO 2007/144658, which is incorporated herein by reference in its entirety.

The vibration is provided by any means which oscillates or vibrates at a frequency capable of exciting the dispersed phase jet so that the dispersed phase jet is broken into droplets, preferably, droplets of a general uniform size. Vibrational excitation causes a uniform shear force across the membrane at a point of egression of the dispersed phase into the suspension phase. The shear force is thought to interrupt the dispersed phase flow through the membrane creating droplets. The shear force may be provided by rapidly displacing the membrane by vibrating, rotating, pulsing or oscillating movement. The direction of shear is substantially perpendicular to the direction of egression of the dispersed phase. Having the pore opening transverse to the oscillating force provides sufficient vibration acceleration to break the jets formed at the pore opening into droplets. The frequency of vibration of the membrane can be from 10 Hz to 20,000 Hz using commercially available vibratory exciters, and as high as 500,000 Hz if piezoelectric exciters are used, as supplied by Electro Dynamic shaker, Permanent magnet shaker or Piezo electro-cell. Typical frequencies of vibration are from 10 Hz-20000 Hz, preferably 20-1000 Hz. Suitable amplitude values are in the range of about 0.001 to about 50 mm.

For the suspension polymerization process, the dispersed phase includes one or more polymerizable monomers which forms a discontinuous phase dispersed throughout the suspension medium upon the formation of droplets through the membrane. Polymerizable monomers of the invention are polymerizable monomers or mixtures of two or more copolymerizable monomers that are sufficiently insoluble in a liquid (or a liquid containing a surfactant) to form droplets upon the dispersion of the monomer in the liquid. Advantageously, the polymerizable monomers are monomers polymerizable using suspension polymerization techniques. Such monomers are well known in the art and are described in, for example, E. Trommsdoff et al., *Polymer Processes*, 69-109 (Calvin E. Schildknecht, 1956). In particular, water-insoluble monomers of the invention may include monovinylidene aromatics such as styrene, vinyl naphthalene, alkyl substituted styrenes (particularly monoalkyl substituted styrenes such as vinyltoluene and ethyl vinylbenzene) and halo-substituted styrenes such as bromo- or chlorostyrene, polyvinylidene aromatics such as divinylbenzene, divinyltoluene, divinyl xylene, divinyl naphthalene, trivinylbenzene, divinyl diphenyl ether, divinyl diphenyl sulfone and the like; halo olefins, particularly the vinyl halides such as vinyl chloride; esters of α, β-ethylenically unsaturated carboxylic acids, particularly acrylic or methacrylic acid, such as methyl methacrylate and ethyl acrylate; vinyl acetate, and mixtures thereof. Monovinylidene aromatics, particularly styrene or a mixture of styrene with a monoalkyl substituted styrene; polyvinylidene aromatics, particularly divinylbenzene; esters of α, β-ethylenically unsaturated carboxylic acid, particularly methyl methacrylate or combinations thereof, such as mixtures of styrene and divinylbenzene or styrene, divinylbenzene and methyl methacrylate are preferred.

In one embodiment, preferred monomer mixtures include styrene and divinyl benzene, alone or in combination with a porogen. As used herein, the term "porogen" is defined as a material that is capable of forming pores. Suitable porogens include, for example, aliphatic alcohols such as methyl isobutyl carbinol and isobutyl alcohol.

Water soluble polymerizable monomers are also included in the scope of the present invention. For example, the invention contemplates the use of monomers that form an aqueous solution in water, where the resulting solution is sufficiently insoluble in one or more other suspension liquids, generally a water-immiscible oil or the like, such that the monomer solution forms droplets upon its dispersion in the liquid. Representative water soluble monomers include monomers which can be polymerized using conventional water-in-oil suspension (i.e., inverse suspension) polymerization techniques such as described by U.S. Pat. No. 2,982,749, including ethylenically unsaturated carboxamides such as acrylamide, methacrylamide, fumaramide and ethacrylamide; aminoalkyl esters of unsaturated carboxylic acids and anhydrides; ethylenically unsaturated carboxylic acids, e.g., acrylic or methacrylic acid, and the like. Preferred monomers for use herein are ethylenically unsaturated carboxamides, particularly acrylamide, and ethylenically unsaturated carboxylic acids, such as acrylic or methacrylic acid.

Hydrocolloids and gel forming compounds are also included in the scope of the present invention. For example, the invention contemplates the use of agarose that form an aqueous solution in water, where the resulting solution is sufficiently insoluble in one or more other suspension liquids, generally a water-immiscible oil or the like, such that the agarose or gel forming compound solution forms droplets upon its dispersion in the liquid. Representative water soluble hydrocolloids include dispersed phase which can be formed into a gel using any means well described in the literature and using techniques well known in the art. Subsequent crosslinking of the gel beads formed as above is accomplished as per available publications and using techniques well known in the art.

The amount of monomer present in the dispersed phase will vary. In one embodiment, the dispersed phase includes sufficient liquid to solubilize the monomer. In another embodiment, the monomer includes less than about 50 weight percent of the total monomer dispersed in the aqueous phase. Preferably, the monomer includes from about 30 to 50 weight percent of the monomer dispersed in the aqueous phase for gel polymers. In another embodiment when a porogen is present, the monomer includes less than about 30 weight percent of the total monomer/aqueous phase. Preferably, the monomer includes from about 20 to 35 weight percent of the monomer dispersed in an aqueous phase for macroporous polymer.

Although the monomers can be polymerized using free radical initiation by UV light or heat, or a combination of these methods, in general, chemical radical initiators are preferably used in the present invention. For example, monomer-soluble free radical initiators such as peroxygens, (e.g., benzoyl peroxide, or azobisisobutyronitrile) are advantageously employed in conjunction with water-insoluble monomers. Free radical initiators such as persulfates, hydrogen peroxides or hydroperoxides can also be used. Typically, the ratio of organic initiator to dry monomer is about 0.1 to about 8%, or about 0.5 to about 2% by weight, preferably about 0.8 to about 1.5% by weight.

Conventional polymerization aids, e.g., chain transfer agents, chelating agents and the like, can also be included within the dispersed phase. Pore-forming materials, i.e., those materials which impart a porous structure to the resulting polymer beads, such as aliphatic hydrocarbons such as hexane, toluene and isooctane, and the like, can also be included in the dispersed phase.

The liquid or suspension phase is a medium containing a suspending liquid immiscible with the polymerizable monomer or dispersed phase. Typically, the suspension phase includes water or mixtures of water with one or more water-miscible organic liquids such as lower alkyl alcohols such as methanol or butanol. Preferably, water is used as the suspending liquid. Alternatively, when the dispersed phase includes a water-soluble monomer or a solution of hydrocolloids, a water-immiscible oil is used as the suspension phase. Such water-immiscible oils include, but are not limited to, halogenated hydrocarbons such as methylene chloride, liquid hydrocarbons, preferably having about 4 to about 15 carbon atoms, including aromatic and aliphatic hydrocarbons, or mixtures thereof such as heptane, benzene, xylene, cyclohexane, toluene, mineral oils and liquid paraffins.

The viscosity of the suspension phase is advantageously selected such that the monomer droplets can easily move throughout the suspension phase. In general, droplet formation is readily achieved, and movement of the droplets throughout the suspension medium is facilitated, when the viscosity of the suspension phase is higher or substantially similar to (e.g., of the same order of magnitude) as the viscosity of the dispersed phase. Preferably, the suspension medium has a viscosity of less than about 50 centipoise units (cps) at room temperature. Viscosity values of less than 10 cps are preferred. In one embodiment, the viscosity of the suspension phase is from about 0.1 to about 2 times the viscosity of the dispersed phase.

Examples of viscosity modifiers suitable for use in the invention include, but are not limited to, polyvinylalcohol, polyvinylpyrrolidone, polyvinylcaprolactam, polyacrylic acid, polydimethyldiallyl ammonium chloride, hydrolyzed poly(styrene-co-maleic anhydride), and hydrolyzed poly(methylvinylether-co-maleic anhydride).

Typically, the suspension phase also contains a suspending agent. Examples of suspending agents known to those skilled in the art are proteins such as gelatin, soy protein, hydrolyzed soy protein, wheat protein, spirulina, and rice protein; polysaccharides such as hydroxyethylcellulose, methylhydroxyethylcellulose, hydroxypropylmethylcellulose, carboxymethylcellulose, pectin, xanthan gum, gellan gum, sodium lignosulfonate, agar, carrageenan, sodium alginate, starch, gum arabic, and gum tragacanth. Other additives such as surfactants, buffers, and aqueous inhibitors can also be employed. The aqueous layer may also include dispersants such as calcium lignosulfonate. Especially preferred suspending agents include, e.g., poly vinyl alcohol, polyacrylic acid with Type A gelatin, polydimethyldiallylammonium chloride with Type A gelatin, carboxymethyl cellulose, carboxymethylcellulose with hydroxypolyethylene alkylphenol and polyether phosphate ester, hydroxypropyl methylcellulose, hydroxypropyl methylcellulose with hydroxypolyethylene alkylphenol and polyether phosphate ester, and_methylhydroxyethylcellulose. Preferably, the total amount of suspending agent in the aqueous phase is from 0.05% to 1%, and more preferably, from 0.05% to 0.5%.

The polymerizable monomer droplets are formed by dispersing the monomer phase through the plurality of pores 22 of membrane into the suspension phase. The linear monomer flow rates through the membrane can vary from 1-50 cm/s, preferably 40, 30, 20, or less than 10 cm/s. The monomer droplets may be directed into the suspension phase by pumping or applying a pressure to direct the dispersed phase into the suspension, preferably by pumping. In one embodiment, the applied pressure is in the range of 0.01 to 4 bar and preferably 0.1 to 1.0 bar. In another embodiment, a piston, or similar means such as a diaphragm is used for directing the dispersed phase into the suspension.

The polymerization reaction vessel 10 is advantageously agitated or stirred to prevent significant coalescence or additional dispersion of the monomer droplets during the polymerization. In general, the conditions of agitation are selected such that the monomer droplets are not significantly resized by the agitation, the monomer droplets do not significantly coalesce in the reaction vessel, no significant temperature gradients develop in the suspension and pools of monomer, which may polymerize to form large masses of polymer, are substantially prevented from forming in the reaction vessel.

In general, these conditions can be achieved by using an agitator (paddle) such as described in Bates et al., "Impeller Characteristics and Power," Mixing, Vol. I, V. W. Uhl and J. B. Gray, Eds, published by Academic Press, New York (1966), pp. 116-118. Preferably, the agitator is of the anchor or gate types, as described on pp. 116-118 of Bates et al., or is of the "loop" or "egg beater" types. More preferably, the agitator bars extend up through the surface of the suspension as shown in FIG. 1, thereby preventing the formation of monomer pools on the surface of the suspension.

Upon completion of polymerization, the resulting polymer beads are recovered by conventional techniques such as filtration. The recovered beads can then be further processed. For example, the resulting polymer beads can be further processed and converted to ion exchange resins using techniques well known in the art for converting aromatic polymers to such resins. Generally, anion resins are prepared by haloalkylating the polymer and subsequently attaching anion active exchange groups to the haloalkylated polymer as described, for example, in U.S. Pat. Nos. 2,642,417; 2,960,480, 2,597,492; 2,597,493; 3,311,602; and 2,616,877. Methods for converting polymer beads to cationic resins include sulfonating the polymer using sulfuric or chlorosulfuric acid or sulfur trioxide. Such methods are illustrated in U.S. Pat. Nos. 3,266,007; 2,500,149; and 2,631,127.

Alternatively, upon recovery, the spheroidal beads of various polymers can be prepared as an expandable material. Although the blowing agent required to make such polymers expandable can be incorporated within the monomer phase prior to droplet formation, the beads are advantageously prepared without a blowing agent and the blowing agent subsequently incorporated therein. Conventional techniques well-known in the art and illustrated by the disclosure of U.S. Pat. Nos. 2,681,321; 2,744,291; 2,779,062; 2,888,410 and 3,468,820 can be employed in the present invention. By such methods, the beads are suspended in water in a pressure vessel and the blowing agent, e.g., fluorocarbon gas, is introduced to the vessel. Using pressure and elevated temperatures, e.g., 80°-100° C., the beads absorb the gas.

The polymeric beads can also be employed in the preparation of seeded beads having a uniform particle size. In preparing said seeded beads, polymeric seed beads having uniform size, preferably having a particle size from about 1 to about 300 μm, are prepared by the method of this invention, i.e., the seed beads are prepared at the desired size by breaking a monomer jet by vibratorily exciting the jet and subsequently polymerizing the resulting monomer droplets. The prepared seeded beads can subsequently be chemically modified such as by the attachment of active ion exchange groups to form ion exchange resins.

In one embodiment, the droplets are jetted into a suspension phase in a formation column, and then transported through a transfer line, or conduit, to a reactor so as to minimize droplet coalescence or breakage, as shown in FIG. 3. In one embodiment, polymerization of the monomer droplets occurs once the droplets are transferred to a polymerization reactor, as shown in FIG. 1. The reaction conditions can be modulated as necessary to achieve optimal product yield. In one embodiment, the polymerization occurs at a temperature range of about 20 to about 120° C. A reaction temperature of about 60 to 90° C. is preferred. In another embodiment, the duration of the polymerization reaction is about 1 to about 24 hours. In another embodiment, the polymerization is carried out at a pressure range of about 1 to 2 bar.

Various reagents may be added to the reactor to facilitate the polymerization step. For example, coalescence preventers such as sodium nitrite, sodium dichromate, methylene blue and/or alkali metal iodides may be added to the polymerization reaction mixture.

The spheroidal polymer beads prepared by the method of the invention exhibit other properties desired of polymers prepared in bead form. For example, the beads can be functionalized to include unique chemical groups. In particular, isolated bead particles can be reacted under Friedel-Crafts reaction conditions to form alkylated or acylated bead products. In some embodiments, the invention is useful for forming polymers of linear polysaccharide agarose beads.

The method and compositions of the present invention provides a highly efficient and productive method for preparing uniform sized spheroidal polymer particles from polymerizable monomers, particularly monomers that are polymerizable using suspension polymerization techniques. The method is particularly useful in the preparation of uniform polymer beads having an average particle diameter in the range of about 1 to about 300 μm. The polymer beads prepared using the method of the invention are useful for chromatographic applications, as substrates for ion exchange resins, as seeds for the preparation of larger uniform polymer particles, as well as other uses.

The following examples serve to more fully describe the manner of using the above-described invention, as well as to set forth the best modes contemplated for carrying out various aspects of the invention. It is understood that these examples in no way serve to limit the scope of the invention, but rather are presented for illustrative purposes.

Example 1

Preparation of Uniform Gel Polymer Beads (166 μm Volume Ave. Diameter)

Polymer beads of uniform particle size were manufactured using the apparatus configuration shown in FIG. 3. An aqueous phase was prepared at neutral pH with a viscosity of 1 to 1.2 centipoise containing distilled water (4 kg) and polyvinyl alcohol (20 g). The aqueous solution was fed into collection column 30 at rate 16 l/hour. A monomer phase was prepared containing styrene (2.25 kg), divinylbenzene (80%; 0.25 g) and tert-butylperoxy-2-ethyl hexanoate (5 g). The monomer phase was prepared in monomer mix tank under agitation. The monomer phase was then fed to the monomer reservoir feed conduit 16 at a flow rate of 12.6 l/hour. The membrane was then vibrated at 60 Hz and a 1.82 mm peak to peak amplitude.

The membrane used in this Example was a 4×4 cm (L/d) nickel-based membrane (pure nickel) containing several thousand 40 μm through holes connecting the suspension and monomer phases. The monomer phase was then directed through the membrane into the suspension phase at a rate of 12.6 l/hour using a gear pump. The membrane was vibrationally excited to a frequency of 60 Hz as the monomer phase was dispersed in the suspension phase, forming a plurality of monomer droplets in the suspension phase. The resultant droplet emulsion was fed into 6 l glass reactor flask under agitation sufficient to suspend the droplets without resizing the droplets. The reactor was then heated to a reaction temperature of 82° C. and kept at this temperature for 4 hours, than 2 hours at 88° C., and finally 1 hour at 96° C. The droplets polymerized to >95% conversion of monomer to polymer. After separating the polymer beads from the aqueous phase and washing the beads, the following properties were noted: Volume average particle diameter 166 μm, and a uniformity coefficient of 1.16.

The polymer beads were then post-treated by washing with hot distilled water (3× bed volume) and methanol (2× through mesh bed volume), and were subsequently rinsed with ambient deionized water (2× through column bed volume; 2× through mesh bed volume).

The polymer (166 µm) beads were found to exhibit the particle size distribution shown in Table 1. For purposes of comparison the particle size distribution of spheroidal polymer beads of similar size was prepared using:
1. Can jetting
2. Classical plate jetting.
3. Cross-flow vibrational membrane (CFM); and
4. Conventional stirred tank emulsion polymerization methods.

TABLE 1

| | Active generation area of element (cm^2) | Freq. (Hz) | Amp. (mm) | Acceleration (m/s2) | Power consumption (wt) | Productivity (l/hour) | D50 (um) | UC | Yield D50+−10% (%) |
|---|---|---|---|---|---|---|---|---|---|
| can jetting | 50 | 60 | 1.82 | 258 | 39 | 12.6 | 166 | 1.16 | 72 |
| plate jetting | 50 | 850 | 0.049 | 1396 | 1396 | 1.5 | 166 | 1.09 | 82 |
| CFM | 100 | 17 | 3.6 | 41 | 6 | 0.9 | 170 | 1.16 | 72 |
| Conventional suspension polymerisation | NA | NA | NA | NA | NA | NA | 150 | 1.32 | 19 |

In Table 1, the "D60/D10" Uniformity Coefficient (U.C.) value (i.e., the coefficient related to the size distribution of the polymer bead sample) was obtained by dividing the "D60" particle size in the sample (the particle size where 60% of the particles are a smaller size) by a second particle size, "D10" (where 10% of the particles are a smaller size). The yield D50+−10% value was obtained by calculation of relative mass of the beads possess a particle size from about 0.9 to about 1.1 times the average particle size of the beads. As evidenced by the particle size distribution recorded in Table 1, the beads prepared by the present invention exhibit excellent uniformity, particularly compared with conventionally prepared beads made by emulsion polymerization. Comparison with cross-flow membrane and classical plate jetting shows enhanced productivity achieved under present invention as well as reduced power consumption in comparison to plate jetting.

Example 2

Preparation of Uniform Macroporous Polymer Beads (180 µm Volume Ave. Diameter)

Polymer beads of uniform particle size were manufactured using the apparatus configuration shown in FIG. 3. An aqueous phase was prepared at neutral pH with a viscosity of 1 to 1.5 centipoise containing distilled water (4 kg) and polyvinyl alcohol (20 g). The aqueous solution was added to disperser unit 30 and mixed at room temperature with stirring. A monomer phase was prepared containing Styrene (1.8 kg) Divinylbenzene (63%; 122.1 g), iso-octane (1.9 kg), and tert-butylperoxy-2-ethyl hexanoate (56 g). The monomer phase was prepared in monomer mix tank (not shown) under agitation. The monomer phase was then fed to membrane 12 at a flow rate of 13.2 l/h. The membrane 12 was then vibrated at 48 Hz with an amplitude of 2.76 mm to afford 180 µm droplets where 90% of the droplets were in the range of 136 to 202 µm. A droplet formation productivity in the range of 13.2 l/hr was achieved.

The membrane used in this Example was a 4×4 cm nickel-based can-shaped membrane (pure nickel) containing 2,000 40 µm pores per cm² of membrane connecting the suspension and monomer phases. The resultant droplet emulsion was fed into a reactor under agitation sufficient to suspend the droplets without resizing the droplets. The reactor was then heated to a reaction temperature of 80° C. over 10 hours and the droplets polymerized to >95% conversion of monomer to polymer. After separating the polymer beads from the aqueous phase and washing the beads, the following properties were noted: Volume average particle diameter 180 µm, and a uniformity coefficient of 1.19.

The polymer beads were then post-treated by washing with hot distilled water (3× bed volume) and methanol (2× through mesh bed volume; 7× through column bed volume) and were subsequently rinsed with ambient deionized water (2× through column bed volume; 2× through mesh bed volume). The resin was then dry packed through a Buchner apparatus and stored in a solution of ethanol (20%).

As evidenced by this example, the invention provides high productivity formation of monomer droplets using gentle vibrations to generate uniform polymer beads in high yield.

The invention claimed is:
1. A method for preparing spheroidal polymer beads having a volume average particle diameter of about 5 to about 300 µm, the method comprising:
providing an apparatus comprising a cylindrical-shaped double-walled chamber comprising: an outer cylindrical component with a continuous side wall; an inner cylindrical component with a continuous side wall, wherein the side wall of the inner component is spaced inwardly from the side wall of the outer component and the inner component includes a constant diameter throughout the height of the outer wall; wherein the side wall of the inner component and the side wall of the outer component include continuous upper and bottom rims and the rims are joined to form an air tight compartment between the inner and outer components, the side wall of the outer component and the side wall of the inner component comprise a membrane comprising a plurality of pores wherein a first volume is in contact with a first side of the membrane located in the compartment between the inner and outer components of the double-walled chamber and a second volume is in contact with a second side of the membrane located outside of the double-walled chamber, the first volume comprising a polymerizable monomer phase, the second volume comprising an aqueous liquid immiscible with the polymerizable monomer phase;
dispersing the first volume through the pores into the second volume under conditions sufficient to form a plurality of monomer droplets comprising the polymerizable monomer, wherein a shear force is provided at a point of egression of the first volume into the second volume, the direction of shear substantially perpendicular to the direction of egression of the first volume; and polymerizing the droplets dispersed in the second volume.

2. The method according to claim 1, wherein the membrane comprises from about 200 to about 2,000 pores per $cm^2$ of the membrane.

3. The method according to claim 2, wherein the membrane comprises from about 1,000 to about 2,000 pores per $cm^2$ of the membrane.

4. The method according to claim 1, wherein the pores have a diameter in the range of about 1 μm to about 100 μm.

5. The method according to claim 4, wherein the pores have a diameter in the range of about 20 μm to about 60 μm.

6. The method according to claim 1, wherein the plurality of pores are positioned from each other at a distance of at least about 20 times the diameter of each pore when the distance is measured from the center of each pore.

7. The method according to claim 1, wherein the monomer phase is dispersed through the pores into the second volume at a rate of about 1 to about 50 cm/s.

8. The method according to claim 7, wherein the monomer phase is dispersed through the pores into the second volume at a rate of about 40 cm/s.

9. The method according to claim 1, wherein the beads have a particle size distribution having a uniformity coefficient of less than 1.2.

10. The method according to claim 1, wherein the shear at the point of egression of the first volume is provided by displacing the membrane relative to the second volume.

11. The method according to claim 10, wherein the displacing is rotating, pulsing, or oscillating movement.

12. The method according to claim 1, wherein the first volume is dispersed into the second volume by applying pressure to the first volume.

13. The method according to claim 1, wherein monomer phase is directed into the aqueous liquid by pumping the first volume through the membrane.

14. The method according to claim 1, wherein the membrane is substantially metallic.

15. The method according to claim 14, wherein the membrane is wholly metallic.

16. The method according to claim 15, wherein the membrane comprises nickel.

17. The method according to claim 16, wherein the membrane is nickel-plated.

18. The method according to claim 1, wherein the plurality of pores are conical shaped.

19. The method according to claim 1, wherein the pores are in the shape of a slot, with an aspect ratio of slot width to slot length of at least 1:2.

20. The method according to claim 1, wherein the polymerizable monomer phase comprises at least one monomer selected from styrene, divinylbenzene, and methacrylate.

21. The method according to claim 1, wherein the polymerizable monomer phase comprises divinylbenzene.

22. The method according to claim 1, wherein the dispersed phase comprises agarose or other gel forming compounds.

23. The method according to claim 1, wherein the polymerizable monomer phase comprises a porogen.

24. The method according to claim 23, wherein the porogen is an aliphatic alcohol.

25. The method according to claim 24, wherein the aliphatic alcohol is isobutyl alcohol.

26. The method according to claim 1, wherein the membrane comprises nickel, the monomer phase comprises styrene and divinylbenzene and the aqueous liquid comprises polyvinylalcohol.

* * * * *